(12) United States Patent
Sim et al.

(10) Patent No.: US 9,426,544 B1
(45) Date of Patent: Aug. 23, 2016

(54) METHOD AND APPARATUS FOR WIRELESS DIELECTRIC FLUID DETECTION

(71) Applicants: Harry Sim, San Jose, CA (US); Steve Kim, Campbell, CA (US); Robert Shaw, Escondido, CA (US)

(72) Inventors: Harry Sim, San Jose, CA (US); Steve Kim, Campbell, CA (US); Robert Shaw, Escondido, CA (US)

(73) Assignee: Cypress Envirosystems, San Jose, CA (US)

( * ) Notice: Subject to any disclaimer, the term of this patent is extended or adjusted under 35 U.S.C. 154(b) by 0 days.

(21) Appl. No.: 15/057,348

(22) Filed: Mar. 1, 2016

Related U.S. Application Data

(60) Provisional application No. 62/246,142, filed on Oct. 26, 2015, provisional application No. 62/144,232, filed on Apr. 7, 2015.

(51) Int. Cl.
*G08B 23/00* (2006.01)
*H04Q 9/00* (2006.01)

(52) U.S. Cl.
CPC .............. *H04Q 9/00* (2013.01); *H04Q 2209/40* (2013.01); *H04Q 2209/84* (2013.01)

(58) Field of Classification Search
USPC .................................................... 340/870.02
See application file for complete search history.

(56) References Cited

U.S. PATENT DOCUMENTS

| | | | | |
|---|---|---|---|---|
| 3,731,295 A * | 5/1973 | Van Luyn | ............. | H01F 27/402 174/11 R |
| 5,305,779 A * | 4/1994 | Izaguirre | ................. | G05D 9/12 137/172 |
| 5,394,339 A * | 2/1995 | Jones | ...................... | E21B 49/08 137/601.05 |
| 5,417,107 A * | 5/1995 | Biencourt | .......... | G01N 33/2823 324/664 |
| 5,856,783 A * | 1/1999 | Gibb | ..................... | B67D 7/766 324/660 |
| 6,122,973 A * | 9/2000 | Nomura | ................ | G01L 9/0075 361/283.4 |
| 6,157,894 A * | 12/2000 | Hess | ...................... | B64D 37/00 702/141 |
| 6,510,736 B1* | 1/2003 | Van Ee | ...................... | B67C 3/04 73/299 |
| 9,347,312 B2* | 5/2016 | Vincelette | ........... | E21B 43/2406 |
| 2003/0016030 A1* | 1/2003 | Schwartz et al. | ..... | G01N 27/221 324/670 |
| 2004/0007052 A1* | 1/2004 | Belanger | ............ | G01N 33/2847 73/73 |
| 2008/0202745 A1* | 8/2008 | Levy | ..................... | E21B 47/042 166/250.03 |
| 2009/0126483 A1* | 5/2009 | Blendinger | ........... | G01F 23/246 73/304 C |
| 2010/0284823 A1* | 11/2010 | Reynolds et al. | ...... | F01M 5/025 417/13 |
| 2011/0209558 A1* | 9/2011 | Sugiura | ................... | G01F 1/662 73/861.18 |
| 2014/0084945 A1* | 3/2014 | Edvardsson | .......... | G01F 23/284 324/644 |

\* cited by examiner

*Primary Examiner* — Naomi Small
(74) *Attorney, Agent, or Firm* — Manuel de la Cerra

(57) ABSTRACT

A system is disclosed for detecting the presence of dielectric fluids and water in a utility enclosure. The system includes a sensor assembly that may be installed in the utility enclosure. The sensor assembly has an array of capacitance sensors extending into the utility enclosure to an area where the fluids are expected to be present. The sensor assembly also has a pressure sensor that can detect the total pressure of the fluids in the enclosure. The reading from both sensors can be feed to a processor and a transmitter that sends the readings wirelessly to a receiver assembly. The receiver assembly includes a wireless receiver, a second processor connected to the wireless receiver and a display. The processor may process the readings from the sensors to calculate and report the levels of fluids in the enclosure.

11 Claims, 5 Drawing Sheets

METHOD AND APPARATUS FOR WIRELESS DIELECTRIC FLUID DETECTION

1.0 TECHNICAL FIELD

The present invention relates to a system for detecting dielectric fluids.

2.0 BACKGROUND

Dielectric fluids (DF) are used as electrical insulators in high voltage applications, e.g. transformers, capacitors, high-voltage cables, and switchgear (namely high-voltage switchgear). Their functions are to provide electrical insulation, suppress corona and arcing, and to serve as coolants. When this type of fluid leaks from its original location, not only does it cease serving the purpose of making high-voltage equipment safer, but the fluid can become an environmental contaminant. It is therefore desirable to locate such leaks so as to remediate the environmental damage, and to repair any damage to the equipment so that it operates safely.

The current detection methods have not evolved with technology, and essentially require a physical inspection of the utility enclosure. The inspection may be for normal maintenance, or the electrical component located in the enclosure may be performing poorly, suggesting that the fluid may be leaking. In this latter case, the loss of the DF would likely have caused damage to the electrical component. It is advantageous to detect the DF leak before it causes damage.

Therefore a detection solution to this problem would preferably: (1) detect the presence of DF in a utility enclosure; (2) detect DF even when there is water also present in the utility enclosure (or no water at all); (3) differentiate and report the presence of water and/or DF inside the utility enclosure; and (4) transmit detection results wirelessly to a receiver assembly (which could be vehicle mounted) located outside of the utility enclosure. Further, any solution should preferably have its own power source because there may be no line power available in the utility enclosure.

3.0 SUMMARY

A system is disclosed for detecting the presence of dielectric fluid in a utility enclosure. The system includes a sensor assembly that may be installed in the utility enclosure. The sensor assembly has an array of capacitance sensors extending into the utility enclosure to an area where fluids are expected to be present. The sensor assembly also has a pressure sensor that can detect the total pressure of the fluids in the enclosure. The reading from both types of sensors can be fed to a processor and to a transmitter that sends the readings wirelessly to a receiver assembly. The receiver assembly includes a wireless receiver, a second processor connected to the wireless receiver, and a display. The processor may process the readings from the sensors to calculate and report the levels of fluids in the enclosure.

In another aspect, the sensor assembly may also have a power source and, to conserve power, the processor may place the sensors into a sleep mode and periodically open a short listening window to detect a ping from the receiver assembly. When a ping is detected, the processor may collect readings from the array and the pressure sensor and transmit the readings, via the transmitter, to the receiver assembly.

In yet another aspect, the processor or the second processor may perform the following steps: compute a $P_{array}$ (pressure of the array) based on the array readings and a $P_{sensor}$ (pressure of the sensor) based on the pressure sensor readings; compare $P_{array}$ and $P_{sensor}$ and report the following based on the comparison: that the fluid consists of substantially solely water when $P_{array}$ is substantially equal to $P_{sensor}$, and $P_{array} > 0$ and $P_{sensor} > 0$, and further determining the height of the water based on $P_{array}$ or $P_{sensor}$; that the fluid consists of substantially solely DF when $P_{array}$ is substantially equal to 0 and $P_{sensor} > 0$, and further determining the height of the DF based on $P_{sensor}$; that the fluid consists of water and DF when $P_{array} \neq P_{sensor}$ and $P_{array} > 0$ and $P_{sensor} > 0$, and further determining the height of the water based on $P_{array}$, and the height of the DF based on $P_{sensor} - P_{array}$; and that there is no fluid when both $P_{array}$ and $P_{sensor}$ are substantially equal to 0. The reporting may be displayed on the display.

The foregoing summary is illustrative only and is not meant to be exhaustive. Other aspects, objects, and advantages of this invention will be apparent to those of skill in the art upon reviewing the drawings, the disclosure, and the appended claims.

4.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

5.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
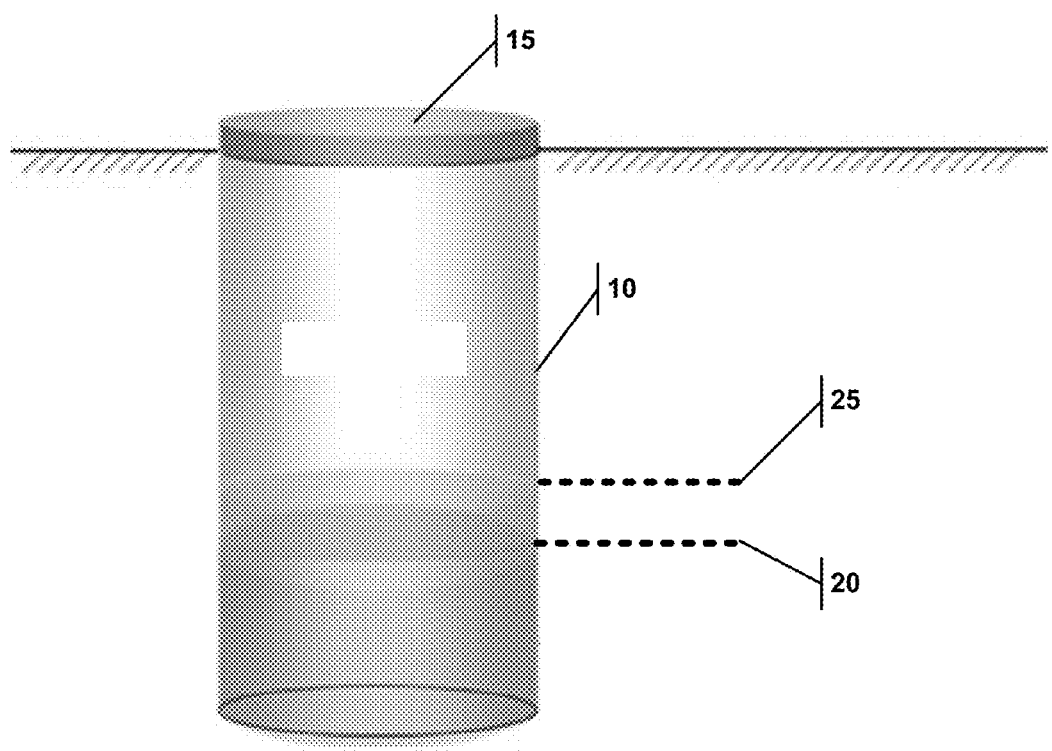
FIG. 1 illustrates a utility enclosure with a dielectric fluid.
Figure 2:
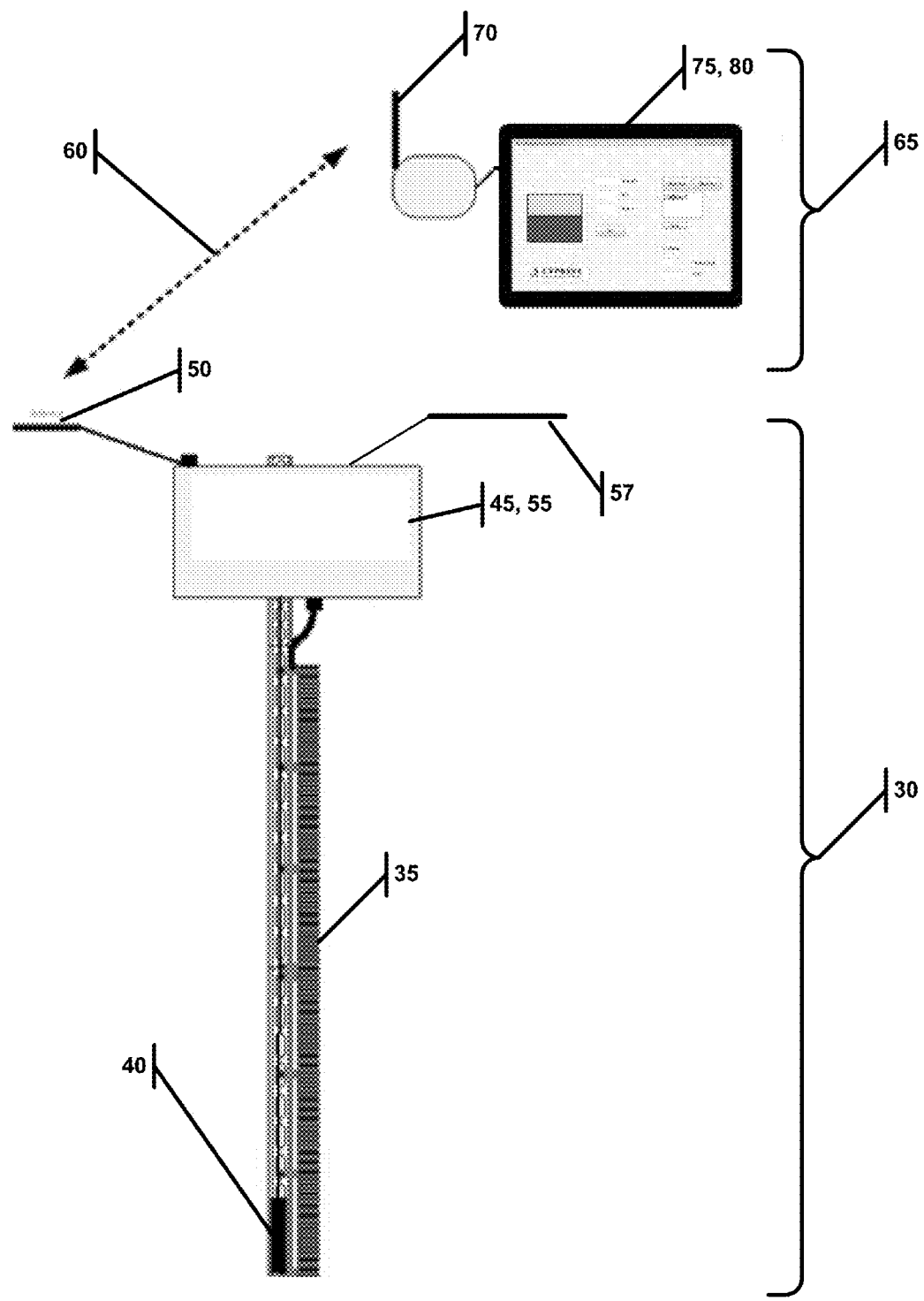
FIG. 2 illustrates a wireless system for detecting dielectric fluids in a utility enclosure.
Figure 3:
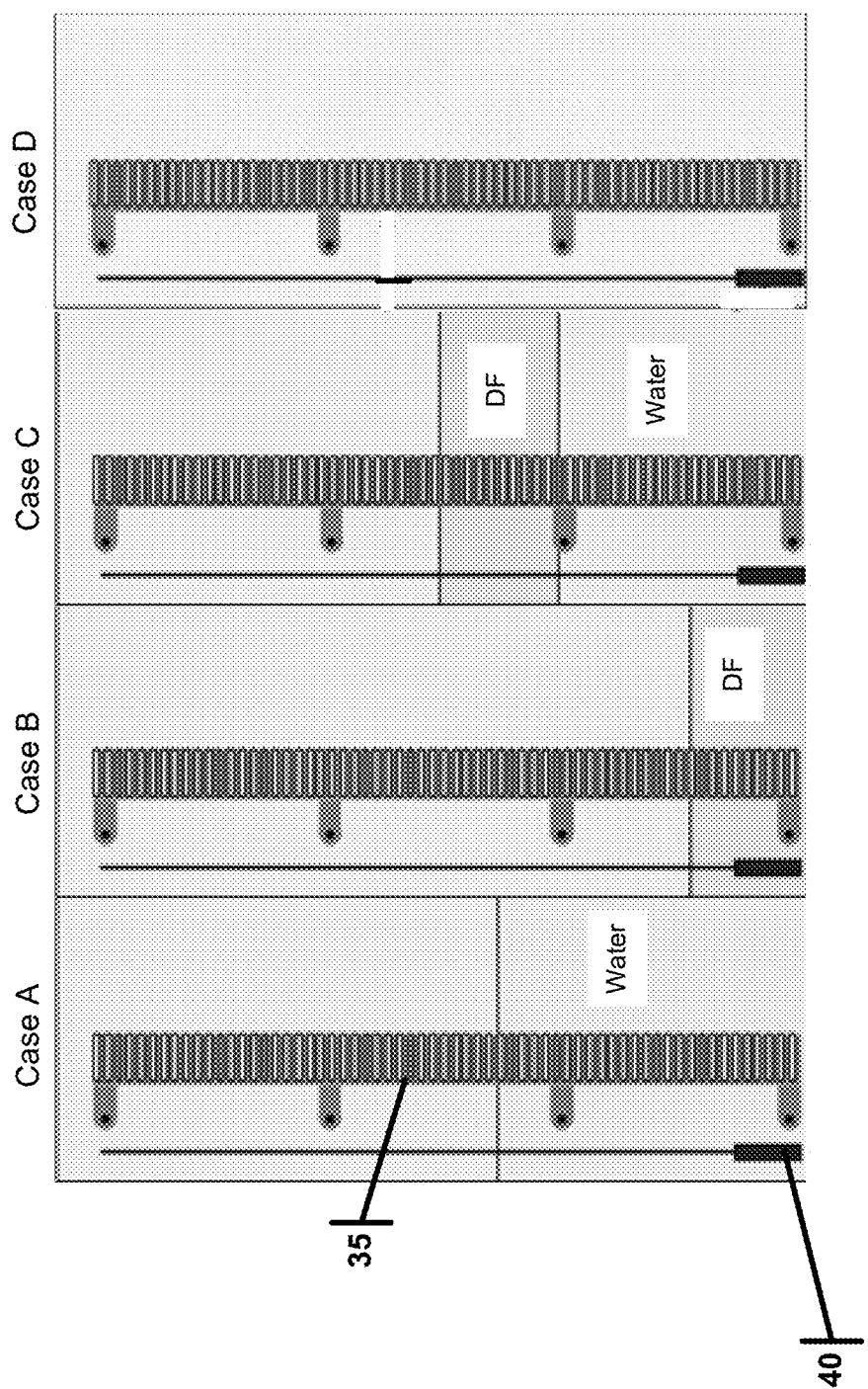
FIG. 3 illustrates four possible cases that may be detected by the wireless system.

The following list of example features corresponds with FIGS. 1-3 and is provided for ease of reference, where like reference numerals designate corresponding features throughout the specification and figures:

Utility enclosure/manhole 10
Utility enclosure cover 15
Water level 20
Dielectric fluid level 25
Sensor assembly 30
Array of capacitance sensors 35
Pressure sensor 40
Processor 45
Transmitter 50
Power source 55
Solar panel 57
Wireless transmission 60
Receiver assembly 65
Wireless receiver 70
Second Processor 75
Display 80

Turning now to FIG. 1, a utility enclosure/manhole 10 is shown with a cover 15. When a DF such as oil leaks, it floats on top of any water that might be in the enclosure 10. This is shown by DF level 25, which lies on top of water level 20. If a dielectric fluid is found, then it indicates that there has been a leak, and the electrical system in which the DF originally resided may not perform as safely or efficiently as expected.

Within an enclosure, water and a DF might be present, as well as air. The main properties for these fluids are:

DF: specific gravity of about 0.86 (floats on top of water) and dielectric constant of ~4 at 23 degrees C.
Water: specific gravity 1.0 and a dielectric constant of 80 at 20 degrees C.
Air: Dielectric constant of about 1.0 at 20 degrees C.

The relative permittivity, $\Sigma_r$, can be measured for static electric fields as follows. First, the capacitance of a test capacitor, $C_0$, is measured with vacuum between its plates. Then, using the same capacitor and distance between its plates, the capacitance $C_x$ with a dielectric between the plates is measured. The relative dielectric constant can be then calculated as:

$$\varepsilon_r = \frac{C_x}{C_0}.$$

Theoretically, by measuring the capacitance of the fluid, a determination can be made if the fluid is DF, water or air. In reality, given that the dielectric constant of a DF such as oil is essentially that of air and the hardware-based means of measuring capacitance is temperature dependent, detecting the DF is not reliable over the operating temperatures. Detection of water with this method is reliable over normal operating temperatures, given the higher dielectric constant.

To reliably detect the presence of both water and DF, the depth of the fluid along with the ability to detect water using the capacitance method is used. The depth of the fluid (DF and/or water) is determined using a pressure sensor placed at the bottom of the utility enclosure. Pressure without detection of water is assumed to be from the DF.

Figure 5:
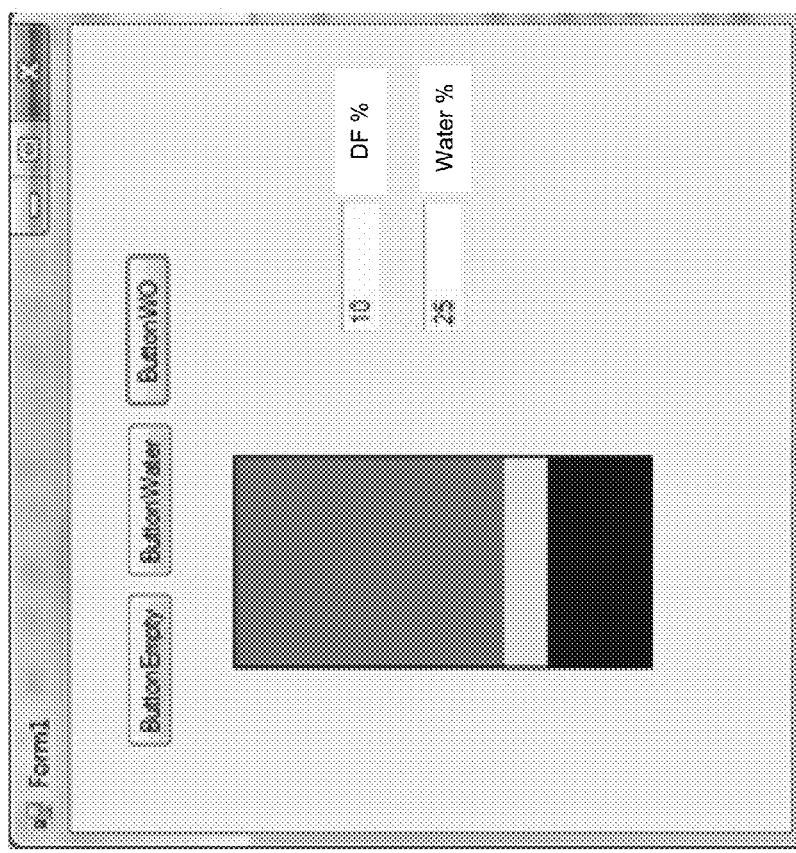
FIG. 5 is graphical user interface displaying the level of water and dielectric fluid in a utility enclosure.

FIG. 2 illustrates a wireless system for detecting DF in a utility enclosure. The system is made up of a sensor assembly 30 and a receiver assembly 65. The sensor assembly 30 is installed in the utility enclosure and includes a pressure sensor 40 and an array of capacitance sensors 35 connected to a processor 45. The processor has a power source 55 such as a battery, which could also include a solar panel 57 for recharging. The battery should support at least three years of detection and reporting operation. The processor is connected to a transmitter 50 that can send a wireless transmission 60 to the wireless receiver 70 that is connected to a second processor 75. A display 80 may also be connected to the second processor 75 to display information (see e.g. FIG. 5). The entire receiver assembly 65 (comprised of the wireless receiver 70, second processor 75 and display 80) may be an integrated computer such as a tablet computer, cell phone or laptop computer. The receiver assembly 65 may be portable, and can be vehicle mounted. The wireless transmitter 50 can be linked to a local area network, a wide area network or a wireless telephone network using GSM or CDMA.

The transmitter 50 may be a local radio that wakes up only on a trigger from a drive-by user. The trigger may be a wireless "ping" that awakens the sensor assembly. This would save battery life because the system would be asleep most of the time. The radio frequency would most likely be 900 MHz or above to maximize transmission ability out of utility enclosure, with a transmission distance of 20-40 ft. to reach a drive-by user/receiver. The receiver assembly would be able to view and store sensor assembly status data within 20 feet of the utility enclosure without opening the cover 15. The receiver assembly may optionally report the sensor assembly status data to a central location.

In a preferred embodiment, the receiver assembly 65 components may consist of a 900 MHz transceiver and a computer to display the information sent from the sensor assembly 30 in the utility enclosure. The sensor assembly 30 consists of a 900 MHz transceiver 50, a processor 45 for controlling all aspects of the assembly, a capacitance sensor array 35 for detecting the water level and a pressure sensor 40 for detecting the total fluid pressure in the utility enclosure. The capacitance sensor array 35 is made up of like sections of circuit boards that contain electrodes that measure capacitance, for example Cypress Semiconductors Model # PS0C4. The electrode boards connect end to end with other electrode boards to form an array of up to 6' with a resolution defined by the spacing of the electrodes. The electrode spacing is defined by the size of the chamber and the volume of liquid to detect. Electrode boards may communicate with the processor 45 using a two wire protocol like I2C. Individual electrode readings along with temperature from each board are collected by the processor 45. Multiple arrays 35 can be joined together with a soldered jumper to create a longer sensing strip.

In a preferred embodiment, the sensor arrays 35 are 12" long with 31 individual capacitance sensors spaced evenly over the length (e.g. Model # PS0C4 4200 series). Several of these 12" sections can be connected together to create the required capacitance-sensing strip length.

FIG. 3 illustrates four cases that the sensor assembly 30 might experience: Case A (Water Only), Case B (DF Only), Case C (Water and DF) and Case D (No Water and No DF).

CASE A (WATER ONLY): In this case, the pressure detected by the capacitance array 35 ($P_{array}$) is determined by measuring the height of the water based on how many electrodes of the array 35 detect water, and then calculating the pressure, so $P_{array}>0$. The independent pressure sensor 40 also determines a pressure ($P_{sensor}$) which is greater than 0. Note that $P_{array}$ and $P_{sensor}$ can be computed in similar units, such that they can be compared to each other. So, for example, the capacitance array may detect water on fifteen of the array's electrodes $P_{array}$ which would equal a certain depth, and the processor could calculate a corresponding effective pressure for that reading. This $P_{array}$ can then be compared to $P_{sensor}$. Alternatively, $P_{sensor}$ can be converted to an expected fluid level, and that can be compared directly to $P_{array}$. If, as a result of this comparison, $P_{array}$ is approximately equal to $P_{sensor}$, the processor can confirm that the fluid in the chamber is substantially only water and the system reports only the height of the water, either by the height of the topmost array sensor to detect water or, alternatively, by the specific gravity of water using $P_{sensor}$. In Case A, $P_{water}=P_{array}=P_{sensor}$; $P_{sensor}>0$ and $P_{array}>0$.

CASE B (DF ONLY): In this case, the pressure sensor 40 detects a pressure (i.e., $P_{sensor}>0$) and the capacitance array 35 does not detect any water, thus the $P_{array}$ is approximately equal to 0. The system then concludes that all the pressure detected is attributable to DF, so $P_{sensor}=P_{DF}$, and calculates the height of the DF given the specific gravity of the DF. In Case B, $P_{DF}=P_{sensor}$; $P_{sensor}>0$ and $P_{array}=0$.

CASE C (DF AND WATER): In this case, the pressure sensor 40 detects the pressure from both fluids combined i.e., $P_{sensor}=P_{water}+P_{DF}$. Both the capacitance array 35 and the pressure sensor 40 detect fluid, but they do not equal each other as they did in case A above. The capacitance array 35, however, only detects capacitance from the portions of the array that are submerged in water, such that $P_{water}$ is approximately equal to $P_{array}$, thus allowing the system to determine the height of the water and the pressure generated by just the water. In this case, both $P_{sensor}$ and $P_{array}$ are greater than 0. With this substitution and rearrangement, $P_{DF}=P_{sensor}-P_{array}$, and the height of the DF is computed as in Case B above. In Case C, $P_{DF}=P_{sensor}-P_{array}$; and $P_{water}=P_{array}$; $P_{sensor}>0$ and $P_{array}>0$.

CASE D (NO DF AND NO WATER): In this case, the pressure sensor 40 detects no pressure because there is no fluid exerting pressure, and the capacitance array 35 detects no capacitance because there is no fluid. In Case D, $P_{DF}=P_{water}=P_{sensor}=0$.

Figure 4:
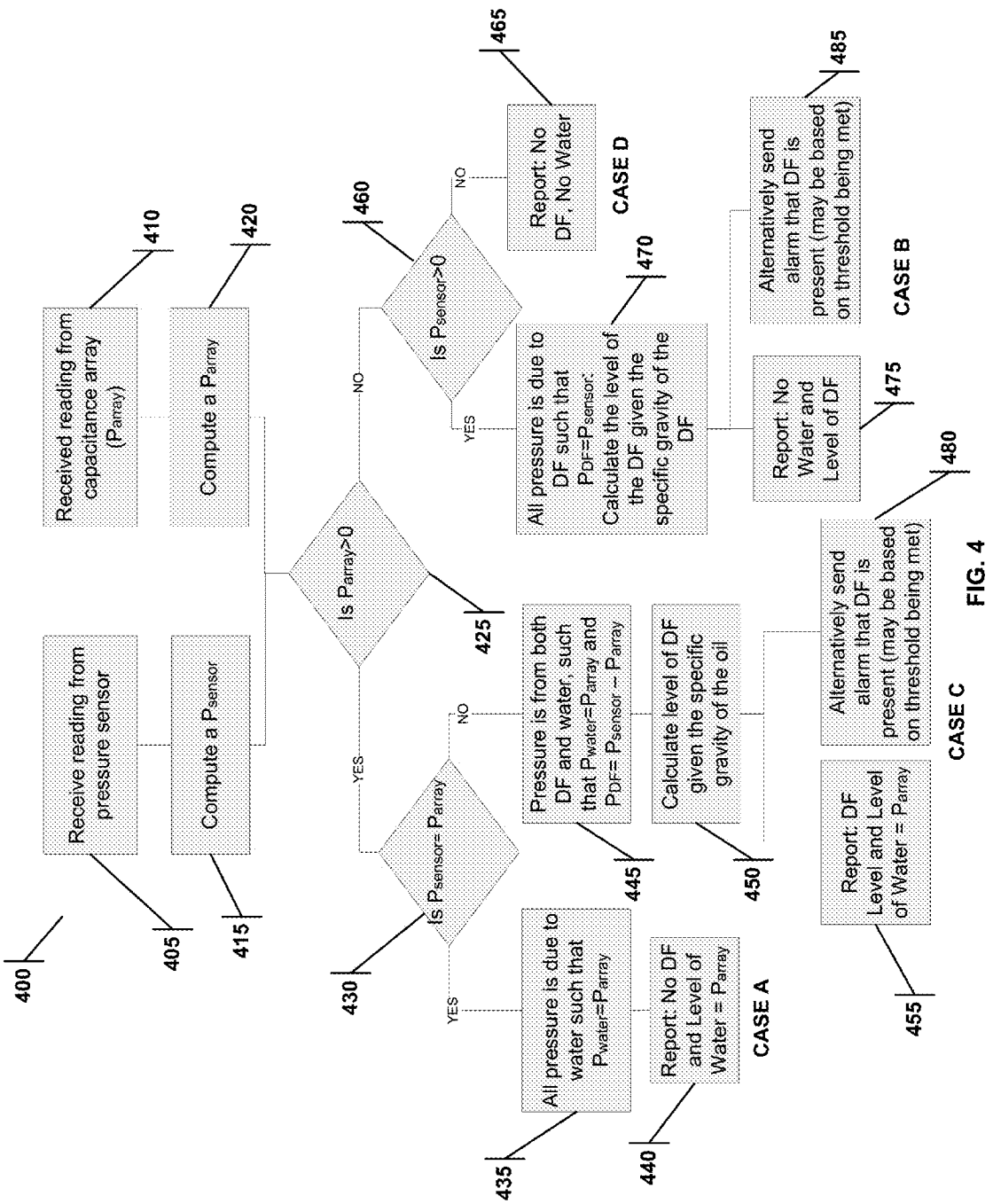
FIG. 4 is a flow chart detailing a method of detecting dielectric fluids in a utility enclosure.

FIG. 4 is a method 400 used by the system to determine which case is present and the levels of the fluids in each case. Alternatively, the method could report the volumes of the fluid because it knows a priori the dimensions of the enclosure or it simply may signal an alert if a dielectric fluid is detected. In this later case, the alert may be adjusted such that the system only alerts if a threshold of DF is detected.

In all cases, the system receives the readings from the pressure sensor and the capacitance array (steps 405 and 410) and computes a $P_{sensor}$ and $P_{array}$ (i.e., a value that can be compared) from the readings (steps 415 and 420). At step 425, the method determines whether $P_{array}$ is greater than zero. If it is, then this indicates that there is water present in the utility enclosure. However, without the pressure sensor data—i.e., $P_{sensor}$—it is impossible to tell whether there is also DF present in the enclosure. The enclosure, for example, may have all water (Case A) or a mixture (Case C). If the pressure sensor reading $P_{sensor}$ is substantially equal to the reading from the capacitance sensor array $P_{array}$, (step 430), then this indicates that all of the fluid in the enclosure is water (step 435). In other words, all the pressure experienced by the pressure sensor 40 is from water such that there is no DF present (step 440, Case A). If the pressure sensor reading $P_{sensor}$ is not equal to the reading from the capacitance sensor array $P_{array}$, (step 430) then this indicates that there is a mixture of fluids in the enclosure (step 445). In other words, the pressure experienced by the pressure sensor 40 is greater than the pressure that is accounted by the sensor array $P_{array}$. It is the difference between the $P_{sensor}$ and the $P_{array}$ that represents the partial pressure contribution ($P_{DF}$) from the DF (step 445). In step 450, the system can calculate the level of DF given the partial DF pressure—i.e., $P_{DF}$—because it knows the dimension of the enclosure and the specific gravity of the DF (step 455, Case C). Alternatively, at step 480, the method may simply set an alarm that DF is present, and that alarm may be based on a threshold level of DF being detected.

If the $P_{array}$ is not greater than zero (step 425), then the method determines whether the pressure on the sensor ($P_{sensor}$) is greater than zero (step 460). If it is not, then there is no fluid present in the enclosure (step 465, Case D). If the pressure sensor 40 does detect pressure, then all of the pressure is due to the DF, such that $P_{DF}=P_{sensor}$ (step 470). In step 470, the system can calculate the level of DF given the DF pressure—i.e., $P_{DF}$—because it knows the dimension of the enclosure and the specific gravity of the DF (step 475, Case B). Alternatively, at step 485, the method may simply set an alarm that DF is present, and that alarm may be based on a threshold level of DF being detected.

The methods disclosed could run on the processor 45 found in the sensor assembly, in which case the results could be transmitted directly to the receiver assembly 65. Alternatively, the sensor assembly 30 may simply wirelessly transmit the raw status data of the sensors 35, 40, and the second processor 75 on the receiver assembly 65 can compute the fluid levels by running the method. The receiver assembly 65 may, alternatively, relay the raw sensor data to a central processor that computes the fluid levels using the method. It would be apparent that the method may be run on a single processor, or the function may be separated onto separate processors.

Although exemplary embodiments and applications of the invention have been described herein, including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A system for detecting the presence of dielectric fluid in a utility enclosure, the system comprising:
   a sensor assembly constructed to be installed in the utility enclosure, the sensor assembly comprising:
   an array of capacitance sensors extending into the utility enclosure to an area where the fluids are expected to be present;
   a pressure sensor adapted to detect a total pressure of the fluids in the enclosure;

a processor connected to the array and the pressure sensor, the processor adapted to collect readings from the array and the pressure sensor;
a transmitter connected to the processor, configured to transmit the readings wirelessly;
a power source connected to the array, processor and transmitter; and
a receiver assembly located outside of the utility enclosure comprising:
a wireless receiver in wireless connection with the transmitter;
a second processor connected to the wireless receiver, the second processor adapted to receive readings from the wireless receiver;
a display adapted to display the readings from the second processor; and
wherein the second processor is adapted to perform the following additional steps:
compute a $P_{array}$ based on the array readings and a $P_{sensor}$ based on the pressure sensor readings;
compare $P_{array}$ and $P_{sensor}$ and report the following based on the comparison:
the fluid consists of substantially solely water when $P_{array}$ is substantially equal to $P_{sensor}$, and $P_{array}>0$ and $P_{sensor}>0$, and further determining a height of the water based on $P_{array}$ or $P_{sensor}$;
the fluid consists of substantially solely dielectric fluid when $P_{array}$ is substantially equal to zero and $P_{sensor}>0$, and further determining a height of the dielectric fluid based on $P_{sensor}$;
the fluid consists of water and dielectric fluid when $P_{array} \neq P_{sensor}$ and $P_{array}>0$ and $P_{sensor}>0$, and further determining the height of the water based on $P_{array}$, and the height of the dielectric fluid based on $P_{sensor}-P_{array}$.

2. The system of claim 1, wherein the processor is adapted to perform the following additional steps:
placing the sensor assembly into a sleep mode;
periodically opening a short listening window to detect a ping from the receiver;
when a ping is detected, collecting readings from the array and the pressure sensor, and transmitting the readings, via the transmitter, to the receiver.

3. The system of claim 1, wherein the reporting is displayed on the display.

4. The system of claim 1, wherein the processor is adapted to perform the following additional steps:
compute a $P_{array}$ based on the array readings and a $P_{sensor}$ based on the pressure sensor readings;
compare $P_{array}$ and $P_{sensor}$ and report the following based on the comparison:
the fluid consists of substantially solely water when $P_{array}$ is substantially equal to $P_{sensor}$, and $P_{array}>0$ and $P_{sensor}>0$, and further determining the height of the water based on $P_{array}$ or $P_{sensor}$;
the fluid consists of substantially solely dielectric fluid when $P_{array}$ is substantially equal to zero and $P_{sensor}>0$, and further determining the height of the dielectric fluid based on $P_{sensor}$;
the fluid consists of water and dielectric fluid when $P_{array} \neq P_{sensor}$ and $P_{array}>0$ and $P_{sensor}>0$, and further determining the height of the water based on $P_{array}$, and the height of the dielectric fluid based on $P_{sensor}-P_{array}$;
wherein the reports are transmitted wirelessly by the transmitter.

5. The system of claim 1, wherein the second processor is adapted to perform the following additional steps: report there is no fluid when $P_{array}$ and $P_{sensor}$ are substantially equal to zero.

6. The system of claim 4, wherein the processor is adapted to perform the following additional steps: report there is no fluid when $P_{array}$ and $P_{sensor}$ are substantially equal to zero.

7. A system for detecting the presence of dielectric fluid in a utility enclosure, the system comprising:
a sensor constructed to be installed in the utility enclosure, the sensor comprising:
an array of capacitance sensors extending into the utility enclosure to an area where the fluids are expected to be present;
a pressure sensor adapted to detect a total pressure of fluids in the enclosure;
a processor connected to the array and the pressure sensor, the processor adapted to collect readings from the array and the pressure sensor; the processor further adapted perform the following steps:
compute a $P_{array}$ based on the array readings and a $P_{sensor}$ based on the pressure sensor readings;
compare $P_{array}$ and $P_{sensor}$ and report the following based on the comparison:
the fluid consists of substantially solely water when $P_{array}$ is substantially equal to $P_{sensor}$, and $P_{array}>0$ and $P_{sensor}>0$, and further determining a height of the water based on $P_{array}$ or $P_{sensor}$;
the fluid consists of substantially solely dielectric fluid when $P_{array}$ is substantially equal to zero and $P_{sensor}>0$, and further determining a height of the dielectric fluid based on $P_{sensor}$;
the fluid consists of water and dielectric fluid when $P_{array} \neq P_{sensor}$ and $P_{array}>0$ and $P_{sensor}>0$, and further determining the height of the water based on $P_{array}$, and the height of the dielectric fluid based on $P_{sensor}-P_{array}$.

8. The system of claim 7, wherein the processor is adapted to perform the following additional steps: report there is no fluid when $P_{array}$ and $P_{sensor}$ are substantially equal to zero.

9. The system of claim 7, further comprising a display and the reporting is displayed on the display.

10. A system for detecting the presence of dielectric fluid in a utility enclosure, the system comprising:
a sensor constructed to be installed in the utility enclosure, the sensor comprising:
an array of capacitance sensors extending into the utility enclosure to an area where the fluids are expected to be present;
a pressure sensor adapted to detect a total pressure of fluids in the enclosure;
a processor connected to the array and the pressure sensor, the processor adapted to collect readings from the array and the pressure sensor; the processor further adapted perform the following steps:
compute a $P_{array}$ based on the array readings and a $P_{sensor}$ based on the pressure sensor readings;
compare $P_{array}$ and $P_{sensor}$ and trigger an alarm when based on the comparison:
the fluid consists of substantially solely dielectric fluid when $P_{array}$ is substantially equal to zero and $P_{sensor}>0$; or
the fluid consists of water and dielectric fluid when $P_{array} \neq P_{sensor}$ and $P_{array}>0$ and $P_{sensor}>0$.

11. The system of claim 10, wherein the alarm trigger is further based on:
    calculating an amount of dielectric fluid detected in the enclosure and triggering the alarm if the amount is greater than a threshold.

* * * * *